United States Patent
Yu et al.

(10) Patent No.: US 9,332,059 B2
(45) Date of Patent: May 3, 2016

(54) METHOD OF FILE SHARING (71) Applicant: WALTON ADVANCED ENGINEERING INC., Kaohsiung (TW)

(72) Inventors: Hong Chi Yu, Kaohsiung (TW); Mao Ting Chang, Kaohsiung (TW)

(73) Assignee: WALTON ADVANCED ENGINEERING INC., Kaohsiung (TW)

( * ) Notice: Subject to any disclaimer, the term of this patent is extended or adjusted under 35 U.S.C. 154(b) by 196 days.

(21) Appl. No.: 14/300,283

(22) Filed: Jun. 10, 2014

(65) Prior Publication Data

US 2015/0304391 A1    Oct. 22, 2015

(30) Foreign Application Priority Data

Apr. 16, 2014    (TW) .............................. 103113815 A (51) Int. Cl.
G06F 15/16        (2006.01)
H04L 29/08        (2006.01)
G06F 17/30        (2006.01)

(52) U.S. Cl.
CPC .......... *H04L 67/06* (2013.01); *G06F 17/30165* (2013.01); *H04L 67/1095* (2013.01)

(58) Field of Classification Search
CPC . G06F 17/30209; G06F 3/0482; G06F 21/62; G06F 21/6209; G06Q 20/10; G06Q 20/1235
See application file for complete search history.

(56) References Cited

U.S. PATENT DOCUMENTS

| | | | |
|---|---|---|---|
| 2003/0225796 A1* | 12/2003 | Matsubara | H04L 63/101 |
| 2005/0010639 A1* | 1/2005 | Long | G06Q 10/10 709/204 |
| 2007/0198698 A1* | 8/2007 | Boyd | G06F 17/30902 709/224 |
| 2007/0208803 A1* | 9/2007 | Levi | H04L 12/5855 709/203 |
| 2012/0110515 A1* | 5/2012 | Abramoff | G06F 17/30994 715/854 |
| 2013/0013931 A1* | 1/2013 | O'Hare | G06F 21/62 713/189 |

* cited by examiner

*Primary Examiner* — Peling Shaw
(74) *Attorney, Agent, or Firm* — Bacon & Thomas, PLLC (57) ABSTRACT

A method of file sharing based on a file server is intended to share specific data and enable data constraints for automatic deletion of specific shared data which has been downloaded by a downloader device.

8 Claims, 7 Drawing Sheets

METHOD OF FILE SHARING

BACKGROUND OF THE INVENTION

1) Field of the Invention

The present disclosure relates to a method of file sharing, particularly a method to delete shared data which has been completely downloaded.

2) Description of the Prior Art

In the digital era for free flow of information, the digitalized information or data should be stored and further shared to users.

Among portable storage devices which are based on USB interfaces and have been popularized since 2000, the flash drives for fast and economic data storage facilitate data sharing. However, the personal security is undoubtedly at risk because the data stored in carriers such as flash drives is shared among users without restrictions and the deleted data is easily accessed via data recovery measures.

The popularization of Internet has made data storage evolve into online storage from existing flash drive-based storage. Moreover, the online storage for which the charge depends on physically occupied storage space has advantages such as neither requirement to purchase other physical storage devices nor data backup by users themselves.

The patents for online storage are summarized as follows:

Patent No. TW 101123690 disclosed a mechanism/method based on cloud computing for sharing of encrypted files and authority management. The mechanism/method features the asymmetric encryption algorithm (e.g., RSA TOKEN) which is used to further encrypt an encryption key during encryption of high sensitive data. Meanwhile, a recovery key governed by a server for hierarchical data control is also used to encrypt the encryption key for security of encrypted files stored in clouds, hierarchical access via the server for hierarchical data control, and sharing of encrypted data.

Patent No. TW 099125643 disclosed a method for cloud services of data sharing based on a specific peer-to-peer channel and a system thereof. The specific channel is constructed with two or more physical USB-based transmission and storage devices via an online pairing process. In addition to direct hardware pairing mechanisms, social network applications are available in one-to-one or one-to-many pairing settings for more intuitive and humanized file sharing. With online pairing completed, files can be directly accessed, transmitted or shared by users via online USB-based transmission and storage devices. Furthermore, users who login a social network are able to preview or subscribe online files or purchase services for authority of file transmission with virtual currency.

Patent No. TW 102117420 disclosed a cloud computing system which fully reduces storage space occupied by an application in a user's device. With the size of a minimizing set, an application resource file installed in an application has a placeholder which substitutes for remaining application resource files and is an empty file looking like an application resource file. A program installed in a user's device to capture an application resource file is capable of detecting any difference between an application resource file and an application resource file's placeholder when an application makes a request of an application resource file. With an application resource file's placeholder detected, a response error can be triggered by the program and an application resource file is acquired by a user device from a remote storage location in a cloud-based storage. Moreover, an application resource file's placeholder is used to replace an installed application resource file.

However, potential risks are threatening security of users who enjoy convenience of online storage, for example, the dilemma of exposing personal privacy or corporate secrets during fast data sharing and difficulty in flexibly controlling authority of a tree structure at management of shared resources.

Accordingly, a method of file sharing is presented to settle the above problems.

SUMMARY OF THE INVENTION

For the above problems, a method of file sharing in the present disclosure depends on data constraints to automatically delete shared data which has been completely downloaded.

A method of file sharing is intended to automatically delete shared data which is downloaded under control of a file server.

A method of file sharing is intended to flexibly manage shared files with a hierarchical file structure restrictively accessed.

A method of file sharing is intended to reduce loading of a single device on a network with shared data temporarily stored in a shared device.

A method of file sharing is intended to facilitate sharing of files in an offline device with shared data temporarily stored in a shared device.

A method of file sharing is intended to increase autonomous data sharing by means of data constraints.

For the above purposes, a method of file sharing is embodied with the following technical measures. A method of file sharing used in a file server for data sharing comprises steps as follows: a management interface which is enabled in an end user device displays a hierarchical directory structure and file information in a file server; a download location over Internet is issued by the file server and displayed on the management interface through which a data sharing request and at least a data constraint for a shared data is entered; the shared data is downloaded from the file server by a downloader device with the download location over Internet enabled and is automatically deleted with data transmitted completely and the button for deletion of downloaded data in the data constraints enabled (or is not deleted with data transmitted completely and the button for deletion of downloaded data in the data constraints disabled).

For the above purposes and technical features, a method of file sharing is further embodied with the following technical measures.

In the method of file sharing, the data constraints comprise conditions to access a hierarchical file structure, that is, levels of a hierarchical file structure accessed by a downloader.

In the method of file sharing, the data constraints comprise a shared-device acceleration button.

In the method of file sharing, the shared data is transmitted to a shared device with the download location over Internet provided from the file server.

In the method of file sharing, the shared device is able to provide a shared data backup to downloaders when the file server is offline.

In the method of file sharing, the downloader devices are a plurality of downloader equipment which accesses the shared data from each other via a pier-to-pier network.

In the method of file sharing, the data constraints comprise at least download frequency, download time and traffic limit.

In the method of file sharing, the download location over Internet can be a URL or a fast response code.

Compared with conventional methods of file sharing, the method of file sharing has some effects as follows: (1) real-time deletion of shared files; (2) flexible security of a hierarchical file structure; (3) high stability of files download with pier-to-pier transmission.

DETAILED DESCRIPTIONS OF THE PREFERRED EMBODIMENTS

The preferred embodiments for a method of file sharing are particularly described hereinafter for understanding purposes, features and effects of a method of file sharing.

Figure 1:
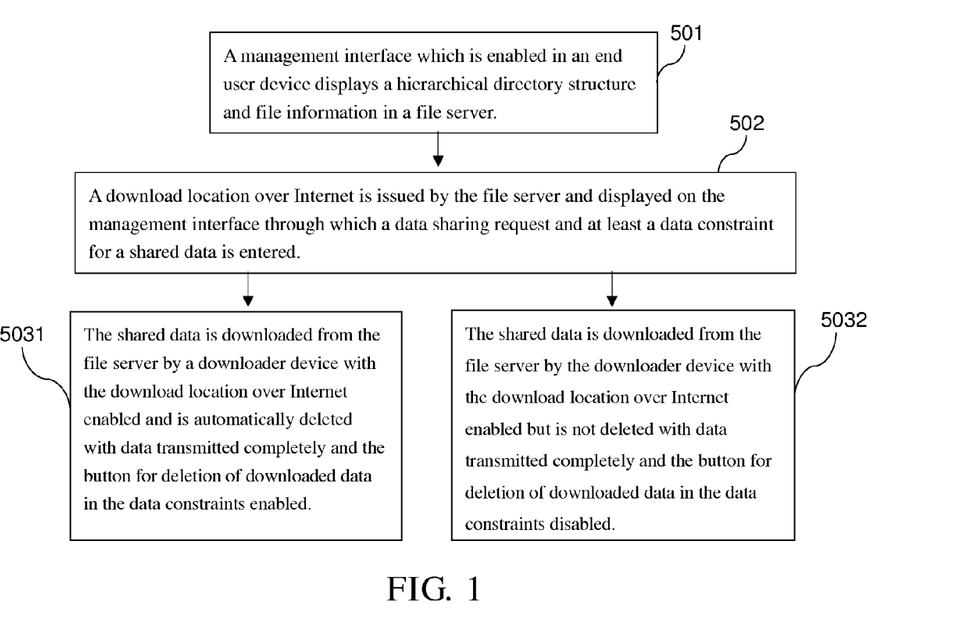
FIG. 1 is a flow chart of executing a method of file sharing in a preferred embodiment.

Please refer to FIGS. 1, 2a, 2b, 2c, 2e, 2f, 2g and 2h which illustrate a method of file sharing in the first embodiment. As shown in FIG. 1, a method of file sharing comprises Step 1 (501), Step 2 (502), Step 3-1 (5031) and Step 3-2 (5032).

For Step 1 (501), please refer to FIGS. 1 and 2a again; in Step 1 (501), a management interface (21) which is enabled in an end user device (1) displays a hierarchical directory structure and file information in a file server (2).

Figure 2A:
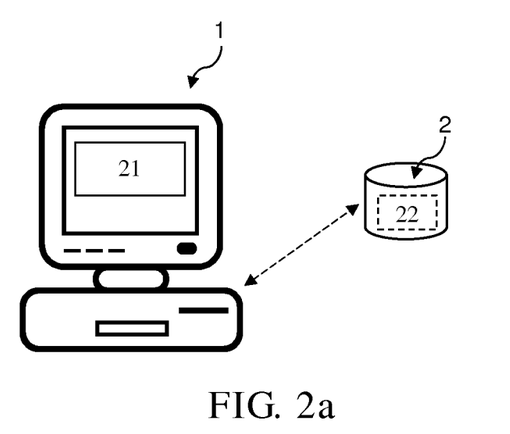
FIG. 2a is a first schematic view for a method of file sharing in a preferred embodiment.

In Step 1 (501), the end user device (1) can be a personal computer or a mobile smart device in which a graphical user interface and network connection software are installed; the management interface (21) is a Graphical User Interface (GUI) as a tool to communicate with a user; the file server (2) is a particular device through which other equipment can retrieve or store files.

For Step 2 (502), please refer to FIGS. 1, 2b and 2c again; in Step 2 (502), a download location over Internet (223) is issued by the file server (2) and displayed on the management interface (21) through which a data sharing request (221) and at least a data constraint (222) for a shared data (22) is entered.

Figure 2B:
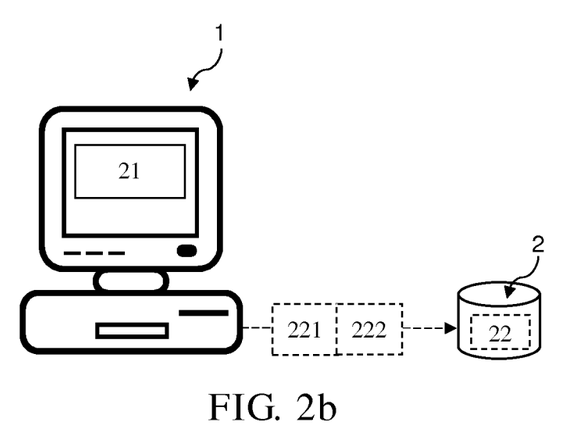
FIG. 2b is a second schematic view for a method of file sharing in a preferred embodiment.
Figure 2C:
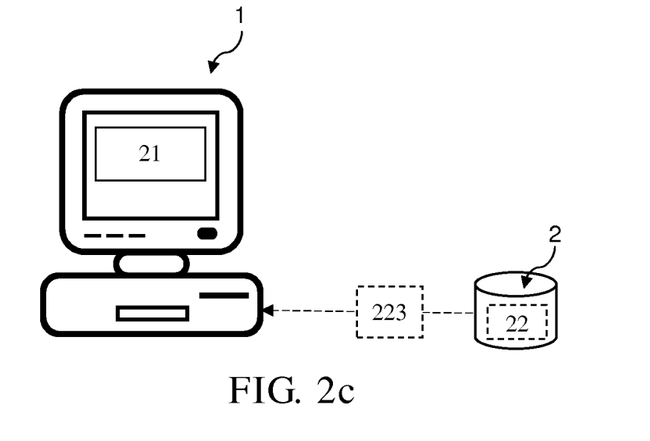
FIG. 2c is a third schematic view for a method of file sharing in a preferred embodiment.

In Step 2 (502), the shared data (22) is stored in the file server (2). The data sharing request (221) and the data constraints (222) are issued to the file server (2) via the management interface (21): the data sharing request (221) for the shared data (22) is a command transmitted to the file server (2) which will provide a download location over Internet (223), that is, a URL or a quick response code expressed in plain codes or encrypted, displayed on the management interface (21) and accessed by a user, for example, the information related to the shared data (22) is indicated in a URL; the data constraints (222) comprise conditions such as button for deletion of downloaded data, download frequency, download time and traffic limit, all of which are stored in and executed by the file server (2).

Figure 3:
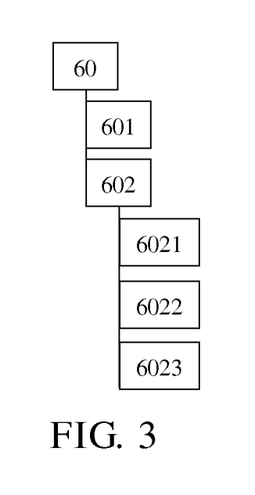
FIG. 3 is a schematic view illustrating a hierarchical file structure for a method of file sharing in a preferred embodiment.

Preferably, the data constraints (222) comprise conditions to access a hierarchical file structure, that is, levels of a hierarchical file structure accessed by a downloader. As shown in FIG. 3, the hierarchical file structure in the file server (2) is a tree structure comprising: a third-level directory 1 (6021), a third-level directory 2 (6022) and a third-level directory 3 (6023) under a second-level directory 2 (602) and a second-level directory 1 (601) and a second-level directory 2 (602) under a root directory (60) as examples indicating constraints to access a hierarchical file structure. For configurations of accessing "zero upper layer" and "zero lower layer" of the second-level directory 2 (602), a downloader can merely access data inside the second-level directory 2 (602); for configurations of accessing "zero upper layer" and "one lower layer" of the second-level directory 2 (602), a downloader can access data stored in the second-level directory 2 (602) as well as the third-level directory 1 (6021), the third-level directory 2 (6022) and the third-level directory 3 (6023) under the second-level directory 2 (602); for configurations of accessing data in directories within the same level, a downloader can access both the second-level directory 2 (602) and the second-level directory 1 (601). As such, data is flexibly managed.

For Step 3-1 (5031), please refer to FIGS. 1, 2e, 2f and 2g. As shown in Step 3-1 (5031), the shared data (22) is downloaded from the file server (2) by a downloader device (4) with the download location over Internet (223) enabled and is automatically deleted with data transmitted completely and the button for deletion of downloaded data in the data constraints (222) enabled.

For Step 3-2 (5032), please refer to FIGS. 1, 2e, 2f and 2h. As shown in Step 3-2 (5032), the shared data (22) is downloaded from the file server (2) by the downloader device (4) with the download location over Internet (223) enabled but is not deleted with data transmitted completely and the button for deletion of downloaded data in the data constraints (222) disabled.

In Step 3-1 (5031) and Step 3-2 (5032), the downloader device (4) can be a personal computer or a mobile smart device in which a graphical user interface and network connection software are installed; the download location over Internet (223) can be either a URL used to open a website or a quick response code enabled with image recognition software/device; the button for deletion of downloaded data is enabled when the file server (2) checks completion of data transmission via the Transmission Control Protocol (TCP) which supplies all packets to be sequentially accepted by receiving ends with specific serial numbers for no packet loss and deletion of the shared data (22).

For no repetitive explanation, an identical number should be given to the same objects which are identically defined and function in first and second embodiments. Therefore, any object referring to the first embodiment and adopted in the second embodiment will not repeatedly described.

Please refer to FIGS. 1, 2a through 2g, 4, and 5a through 5b which illustrate a method of file sharing in the second embodiment different from the first one with addition of a shared-device acceleration button, a shared device (3), a shared data backup (31), and a plurality of downloaders (41, 42) replacing the downloader device (4). As shown in the first embodiment, FIGS. 1, 2*a* through 2*c*, and 2*e* through 2*g* are available to the second embodiment.

Figure 2D:
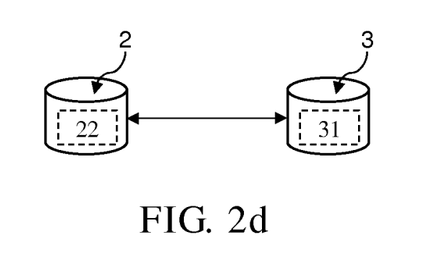
FIG. 2d is a fourth schematic view for a method of file sharing in a preferred embodiment.
Figure 2E:
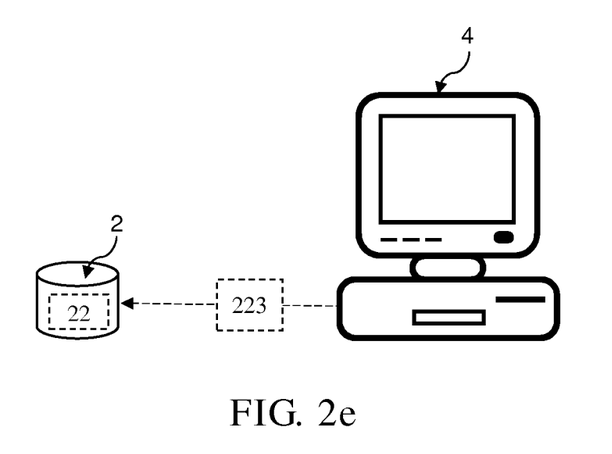
FIG. 2e is a fifth schematic view for a method of file sharing in a preferred embodiment.
Figure 2F:
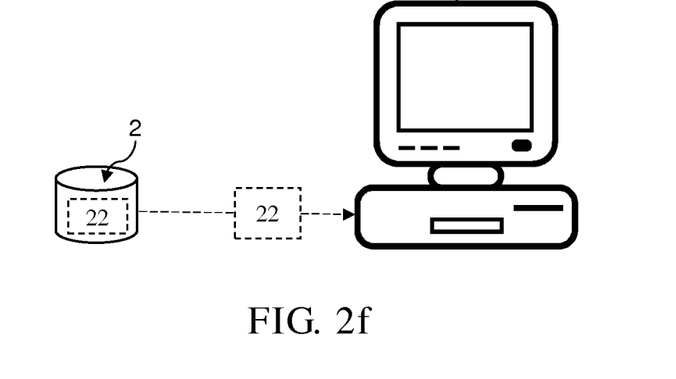
FIG. 2f is a sixth schematic view for a method of file sharing in a preferred embodiment.
Figure 2G:
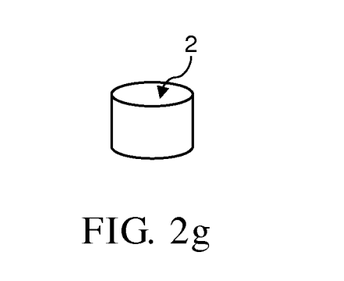
FIG. 2g is a seventh schematic view for a method of file sharing in a preferred embodiment.
Figure 2H:
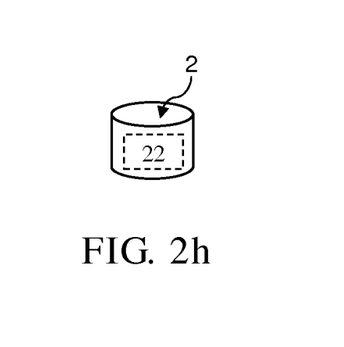
FIG. 2h is an eighth schematic view for a method of file sharing in a preferred embodiment.
Figure 4:
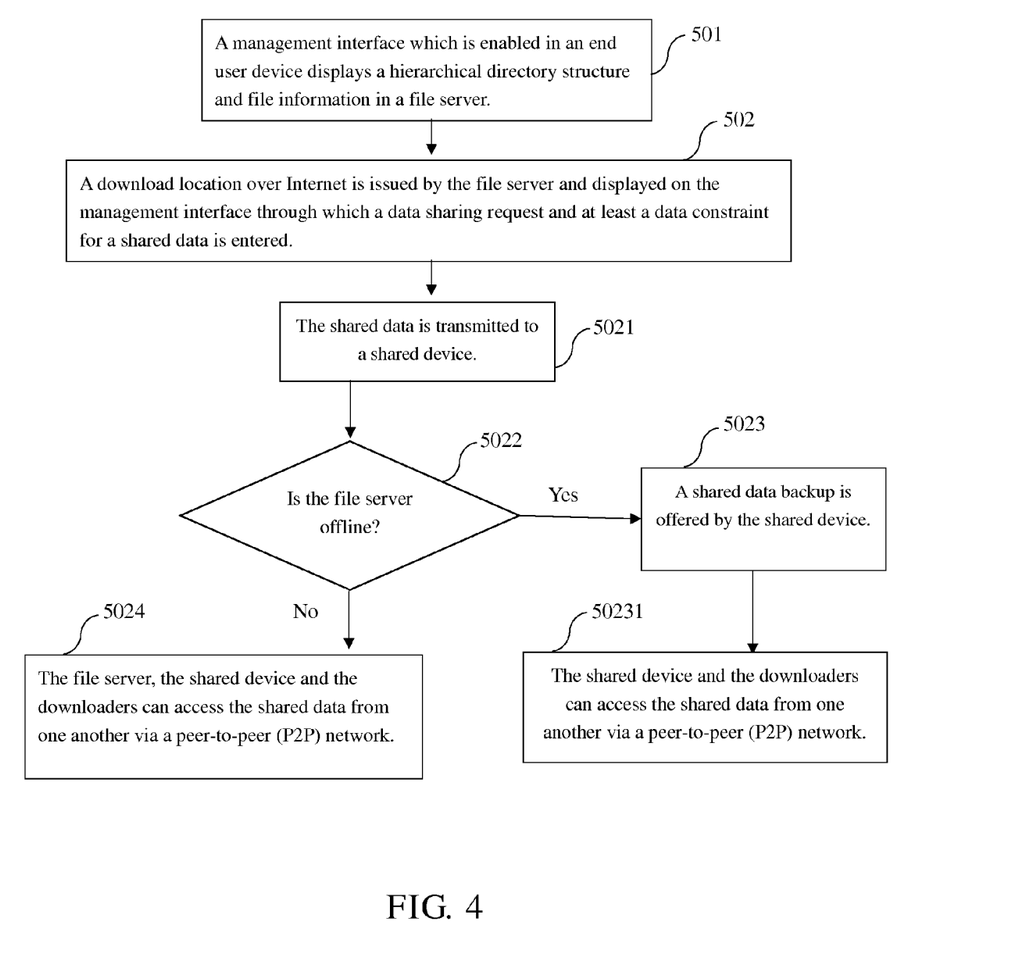
FIG. 4 is a second flow chart of executing a method of file sharing in a preferred embodiment.

Please refer to FIG. 4 which illustrates Step 1 (501) is identical in the first and second embodiments. In Step 2 (502), a default shared-device acceleration button is enabled with the data constraints (222) in addition to conditions in the first embodiment. In Step 2-1 (5021), the shared data (22) is transmitted to a shared device (3) and saved as a shared data backup (31), as shown in FIG. 2*d*. In Step 2-2 (5022), the file server (2) is online and links the shared device (3) with the download location over Internet (223) enabled.

In Step 2 (502) of the second embodiment different from the first one, the download location over Internet (223) created by the file server (2) is provided from the shared device (3), which substitutes for the offline file server (2), and displayed on the management interface (21).

Figure 5A:
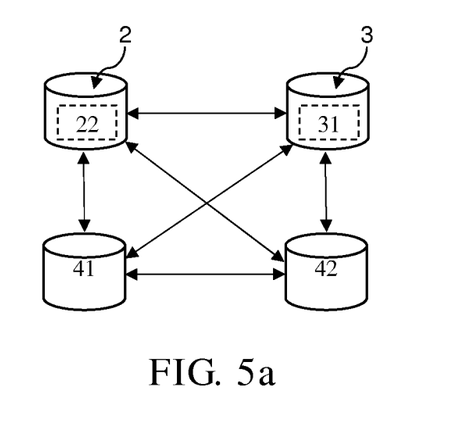
FIG. 5a is a ninth schematic view for a method of file sharing in a preferred embodiment.
Figure 5B:
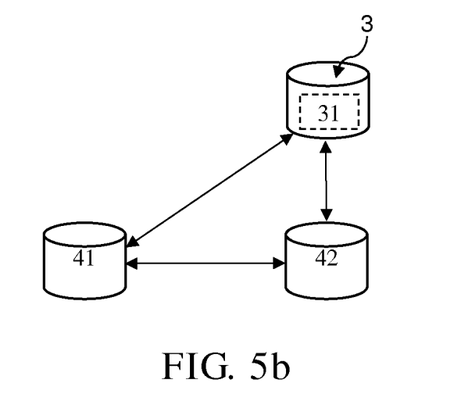
FIG. 5b is a tenth schematic view for a method of file sharing in a preferred embodiment.

As shown in Step 2-3 (5023), the shared data backup (31) is offered by the shared device (3) in place of the offline file server (2). As shown in FIG. 5*b* and Step 2-31 (50231), the plurality of downloader equipment (41, 42) and the shared device (3) can access the shared data backup (31) from one another via a peer-to-peer (P2P) network.

As shown in Step 2-4 (5024), the shared data (22)/the shared data backup (31) is provided by the online file server (2)/the shared device (3). As shown in FIG. 5*a*, the plurality of downloader equipment (41, 42), the file server (2) and the shared device (3) can access the shared data (22)/the shared data backup (31) from one another via a peer-to-peer (P2P) network.

Accordingly, a method of file sharing in the present disclosure, which differs from a conventional method of file sharing, is referred to as creative work that meets patentability and is applied for the patent.

It should be reiterated that the above descriptions presents preferred embodiments, and any equivalent change in specifications, claims, or drawings still belongs to the technical field within the present disclosure with reference to claims hereinafter.

What is claimed is:

1. A method of file sharing used in a file server on a network for data sharing and comprises steps as follows:
    a management interface which is enabled in an end user device displays a hierarchical directory structure and file information in said file server;
    a download location over Internet is issued by said file server and displayed on said management interface through which a data sharing request and at least a data constraint for a shared data is entered; and
    said shared data is downloaded from said file server by a downloader device with said download location over Internet enabled and is automatically deleted with data transmitted completely and a button for deletion of downloaded data in said data constraints enabled (or is not deleted with data transmitted completely and a button for deletion of downloaded data in said data constraints disabled).

2. A method of file sharing according to claim 1 wherein said data constraint comprise conditions to access a hierarchical file structure, that is, levels of a hierarchical file structure accessed by a downloader.

3. A method of file sharing according to claim 1 wherein said data constraints comprise a shared-device acceleration button.

4. A method of file sharing according to claim 3 wherein said shared data is transmitted to a shared device with said download location over Internet provided from said file server.

5. A method of file sharing according to claim 4 wherein said shared device is able to provide a shared data backup to downloaders when said file server is offline.

6. A method of file sharing according to claim 1 wherein said downloader devices are a plurality of downloader equipment which accesses said shared data from each other via a pier-to-pier network.

7. A method of file sharing according to claim 1 wherein said data constraints comprise at least download frequency, download time and traffic limit.

8. A method of file sharing according to claim 1 wherein said download location over Internet can be a URL or a fast response code.

* * * * *